(12) United States Patent
Sung et al.

(10) Patent No.: US 10,338,525 B2
(45) Date of Patent: Jul. 2, 2019

(54) HOLOGRAPHIC DISPLAY APPARATUS HAVING STEERABLE VIEWING

(71) Applicants: SAMSUNG ELECTRONICS CO., LTD., Suwon-si (KR); KYUNGPOOK NATIONAL UNIVERSITY INDUSTRY-ACADEMIC COOPERATION FOUNDATION, Daegu (KR)

(72) Inventors: Geeyoung Sung, Daegu (KR); Joonku Hahn, Daegu (KR); Wontaek Seo, Yongin-si (KR); Hongseok Lee, Seoul (KR)

(73) Assignees: SAMSUNG ELECTRONICS CO., LTD., Suwon-si (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 47 days.

(21) Appl. No.: 15/790,742

(22) Filed: Oct. 23, 2017

(65) Prior Publication Data

US 2018/0284693 A1 Oct. 4, 2018

(30) Foreign Application Priority Data

Mar. 30, 2017 (KR) .......................... 10-2017-0040792

(51) Int. Cl.
*G03H 1/08* (2006.01)
*G03H 1/02* (2006.01)
(Continued)

(52) U.S. Cl.
CPC ........... *G03H 1/02* (2013.01); *G02B 27/0101* (2013.01); *G02B 27/0103* (2013.01);
(Continued)

(58) Field of Classification Search
CPC .......... G03H 1/00; G03H 1/22; G03H 1/0406; G03H 1/2205; G02B 27/1046; G02B 27/0101; G02B 5/32
(Continued)

(56) References Cited

U.S. PATENT DOCUMENTS 4,671,625 A * 6/1987 Noble ................ G02B 27/2292
359/478
6,843,564 B2 1/2005 Putilin et al.
(Continued)

FOREIGN PATENT DOCUMENTS

JP 2007-256343 A 10/2007
JP 2015-31939 A 2/2015

*Primary Examiner* — Audrey Y Chang
(74) *Attorney, Agent, or Firm* — Sughrue Mion, PLLC

(57) ABSTRACT

A holographic display apparatus capable of steering a location of a viewing window according to a location of an observer is disclosed. The holographic display apparatus includes a light source; a spatial light modulator configured to modulate incident light and thereby reproduce the holographic image; a spatial filter configured to transmit only the holographic image; an eye tracker configured to track a pupil location of an observer; and a controller configured to adjust locations of the light source and the spatial filter in response to a change in the pupil location of the observer received from the eye tracker. The controller is configured to move the light source and the spatial filter simultaneously in the same direction by the same distance.

8 Claims, 12 Drawing Sheets

(51) Int. Cl.
  *G02B 27/10*  (2006.01)
  *G03H 1/22*  (2006.01)
  *H04N 13/32*  (2018.01)
  *G02B 27/22*  (2018.01)
  *G02B 27/01*  (2006.01)

(52) U.S. Cl.
  CPC ..... *G02B 27/1046* (2013.01); *G02B 27/2292* (2013.01); *G03H 1/2205* (2013.01); *G03H 1/2286* (2013.01); *G03H 1/2294* (2013.01); *H04N 13/32* (2018.05); *G03H 2001/0216* (2013.01); *G03H 2001/221* (2013.01); *G03H 2001/2207* (2013.01); *G03H 2001/2234* (2013.01); *G03H 2223/18* (2013.01); *G03H 2223/24* (2013.01); *G03H 2226/05* (2013.01); *G03H 2227/03* (2013.01)

(58) Field of Classification Search
  USPC ................................ 359/13, 15, 32, 33, 478
  See application file for complete search history.

(56) References Cited

U.S. PATENT DOCUMENTS

| | | | |
|---|---|---|---|
| 7,523,848 B2* | 4/2009 | Beatson | B23K 20/007 228/102 |
| 8,120,828 B2* | 2/2012 | Schwerdtner | G02B 5/32 345/32 |
| 9,116,505 B2* | 8/2015 | Schwerdtner | G02B 5/1876 |
| 2014/0016051 A1 | 1/2014 | Kroll et al. | |

* cited by examiner

HOLOGRAPHIC DISPLAY APPARATUS HAVING STEERABLE VIEWING

CROSS-REFERENCE TO RELATED APPLICATION

This application claims priority from Korean Patent Application No. 10-2017-0040792, filed on Mar. 30, 2017, in the Korean Intellectual Property Office, the disclosure of which is incorporated herein, by reference, in its entirety.

BACKGROUND

1. Field

Apparatuses consistent with the present disclosure relate to a holographic display apparatus, and more particularly, to a holographic display apparatus capable of steering a location of a viewing window according to a location of an observer.

2. Description of the Related Art

Methods of realizing 3D images, such glasses-type methods and non-glasses-type methods, are widely used. Examples of glasses-type methods include deflected glasses-type methods and shutter glasses-type methods, and examples of non-glasses-type methods include lenticular lens methods and parallax barrier methods. These methods utilize binocular parallax, and an ability to increase the number of viewpoints is limited. In addition, these methods make viewers feel tired due to the difference between the depth perceived by a viewer's brain and the focus of the viewer's eyes.

Recently, holographic display methods, which are 3D image display methods that can provide full parallax and are capable of making the depth perceived by the brain consistent with the focus of the eyes, have been gradually put to practical use. According to a holographic display technique, when reference light is irradiated onto a hologram pattern having recorded thereon an interference pattern obtained by interference between object light reflected from an original object and the reference light, the reference light is diffracted and an image of the original object is reproduced. When a currently-commercialized holographic display technique is used, a computer-generated hologram (CGH), rather than a hologram pattern obtained by directly exposing an original object to light, is provided to a spatial light modulator as an electrical signal. Then, the spatial light modulator forms a hologram pattern and diffracts reference light according to the input CGH signal, thereby generating a 3D image.

Additionally, technologies have been developed which provide a 3D image irrespective of a location of an observer by adjusting a viewing window of a holographic display apparatus according to the location of the observer. However, when a location change of the observer and a location adjustment of the viewing window are inconsistent with each other, diffracted light may be incident on the eyes of the observer, which may inhibit the appreciation of the 3D image and may cause damage to the observer's eyes.

SUMMARY

Additional exemplary aspects and advantages will be set forth in part in the description which follows and, in part, will be apparent from the description, or may be learned by practice of the presented exemplary embodiments.

According to an aspect of an exemplary embodiment, a holographic display apparatus includes: a light source configured to output light; a spatial light modulator configured to form a hologram pattern to modulate incident light and thereby reproduce a holographic image; a lens configured to collimate light incident thereon from the light source and to focus the light incident thereon from the spatial light modulator; a retroreflective mirror configured to reflect the collimated light incident thereon from the lens and thereby change a travel direction of the light by 180 degrees; a spatial filter configured to transmit only the holographic image; an eye tracker configured to track a pupil location of an observer; and a controller configured to adjust locations of the light source and the spatial filter in response to information identifying a change in the pupil location of the observer received from the eye tracker.

The light source and the spatial filter may be arranged adjacent to each other in a focal plane of the lens.

The holographic display apparatus may further include a stage on which the light source and the spatial filter are mounted together.

The light source and the spatial filter may be movable in a direction perpendicular to an optical axis of the lens, and the controller may be configured to move the light source and the spatial filter simultaneously in a same direction by a same distance.

The lens may include a first semicircular region and a second semicircular region which are symmetric with respect to an optical axis of the lens, and the light source may be configured to provide light to the first semicircular region of the lens.

The retroreflective mirror may include a first mirror and a second mirror that are tilted so as to face each other, the first mirror and the second mirror are symmetrically inclined with respect to an optical axis of the lens, the first mirror faces the first semicircular region of the lens and the second mirror faces the second semicircular region of the lens, and light emitted from the light source and which passes through the first semicircular region of the lens is reflected from the first mirror and the second mirror and then travels toward the second semicircular region of the lens.

The spatial light modulator may be disposed on an optical path between the lens and the retroreflective mirror.

According to an aspect of another exemplary embodiment, a holographic display apparatus includes: a light source configured to output light; a spatial light modulator configured to form a hologram pattern to modulate incident light and thereby reproduce a holographic image; a first lens configured to collimate light incident thereon from the light source; a second lens configured to focus the light modulated by the spatial light modulator; a retroreflective mirror configured to reflect the collimated light incident from the first lens and thereby change a travel direction of the light by 180 degrees; a spatial filter configured to transmit only the holographic image; an eye tracker configured to track a pupil location of an observer; and a controller configured to adjust locations of the light source and the spatial filter in response to information identifying a change in the pupil location of the observer received from the eye tracker.

The light source and the spatial filter may be arranged in a focal plane of the second lens, and the light source may be disposed on an optical axis of the first lens and the spatial filter is disposed on an optical axis of the second lens.

The light source and the spatial filter may be movable in a direction perpendicular to optical axes of the first lens and the second lens, and the controller may be configured to move the light source and the spatial filter simultaneously in a same direction by a same distance.

The retroreflective mirror may include a first mirror and a second mirror that are tilted so as to face each other, the first mirror and the second mirror are symmetrically inclined with respect to a central optical axis of an entire optical system including the first lens, the second lens, and the retroreflective mirror, the first mirror faces the first lens and the second mirror faces the second lens, and light emitted from the light source and which passes through the first lens is reflected from the first mirror and the second mirror and then travels toward the second lens.

The spatial light modulator may be disposed on an optical path between the first lens and the second lens.

According to an aspect of another exemplary embodiment, a holographic display apparatus includes: a light source configured to output light; a first lens configured to collimate light incident from the light source; a second lens configured to focus the collimated light from the first lens to an intermediate image plane; a third lens configured to collimate light from the intermediate image plane; a fourth lens configured to focus the collimated light from the third lens to a focal plane; a spatial light modulator configured to form a hologram pattern to modulate incident light and thereby reproduce a holographic image; a spatial filter configured to transmit only the holographic image; an eye tracker configured to track a pupil location of an observer; and a controller configured to adjust locations of the light source and the spatial filter in response to information identifying a change in the pupil location of the observer received from the eye tracker.

The spatial filter may be arranged in a focal plane of the fourth lens.

The holographic display apparatus may further include a stage on which the light source and the spatial filter are mounted.

The light source and the spatial filter may be movable in a direction of an optical axis or in a direction perpendicular to the optical axis, and the controller may be configured to move the light source and the spatial filter simultaneously in a same direction by a same distance.

The spatial light modulator may be disposed on an optical path between the third lens and the fourth lens.

The holographic display apparatus may further include a retroreflective lens disposed on an optical path between the second lens and the third lens and configured to bend the optical path by 180 degrees.

The retroreflective mirror may include a first mirror and a second mirror that are tilted so as to face each other, the first mirror may face the second lens and the second mirror faces the third lens, and an intermediate image plane may be disposed between the first mirror and the second mirror.

The light source and the spatial filter may be disposed adjacent to each other on a same side in the holographic display apparatus, and the holographic display apparatus may further include a driving apparatus for moving the light source and the spatial filter.

The driving apparatus may include: a rotatable circular wheel; a motor for rotating the wheel; a first stage disposed in contact with an upper outer circumferential surface of the wheel; a first actuator for moving the first stage up and down; a second stage disposed in contact with a lower outer circumferential surface of the wheel; and a second actuator for moving the second stage up and down, wherein the light source is disposed on the first stage and the spatial filter is disposed on the second stage, and the controller is configured to move the first and second stages up and down by using the first and second actuators or rotate the wheel using the motor, in response to information identifying a change in a pupil location of an observer received from the eye tracker.

According to an aspect of another exemplary embodiment, a heads-up display apparatus includes: a holographic display apparatus; and an optical system configured to reflect a holographic image reproduced by the holographic display apparatus toward a front mirror of a vehicle, wherein the holographic display apparatus includes: a light source configured to output light; a spatial light modulator configured to form a hologram pattern to modulate incident light and thereby reproduce the holographic image; a lens configured to collimate light incident from the light source and focus the light modulated by the spatial light modulator; a retroreflective mirror configured to reflect the collimated light from the light source through the lens and change a travel direction of the light by 180 degrees; a spatial filter configured to transmit only the holographic image; an eye tracker configured to track a pupil location of an observer; and a controller configured to adjust locations of the light source and the spatial filter in response to information identifying a change in the pupil location of the observer received from the eye tracker.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
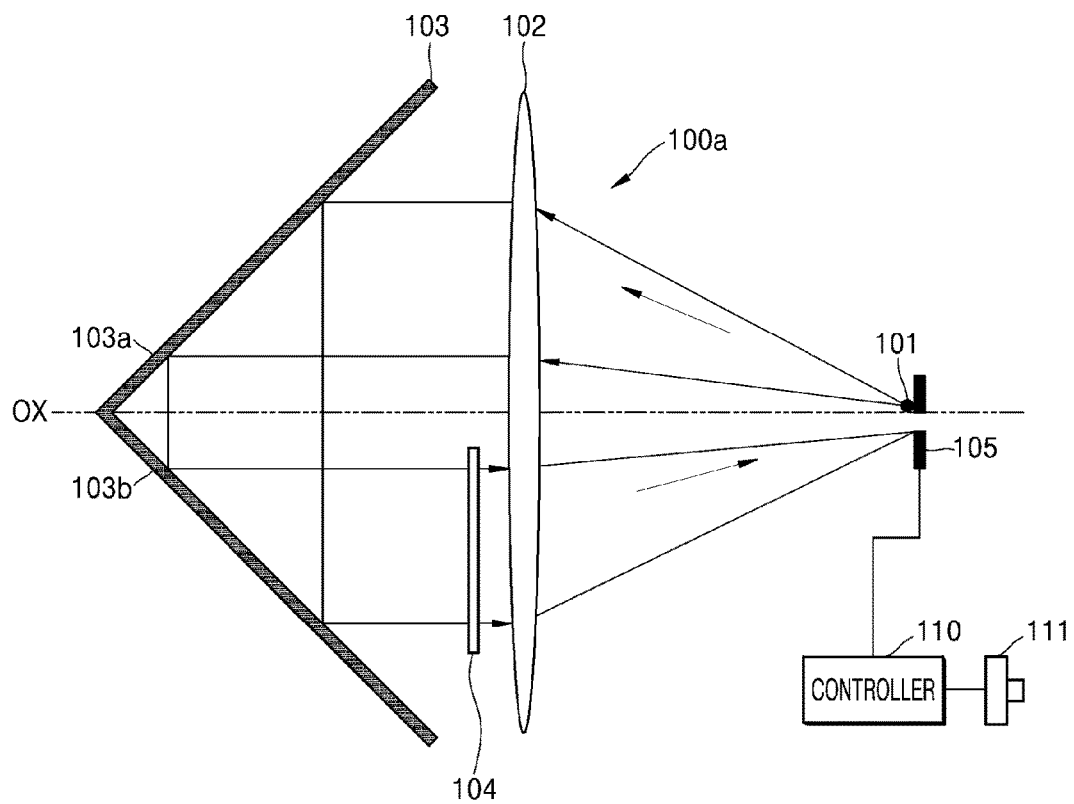
FIG. 1 schematically shows a configuration of a holographic display apparatus according to an exemplary embodiment.

Hereinafter, with reference to the accompanying drawings, a holographic display apparatus including a steering viewing window will be described in detail Like reference numerals refer to like elements throughout, and in the drawings, sizes of elements may be exaggerated for clarity and convenience of explanation. The embodiments described below are merely exemplary, and various modifications may be possible. In a layer structure described below, an expression "above" or "on" may include not only "immediately on in a contact manner" but also "on in a non-contact manner".

FIG. 1 schematically shows a configuration of a holographic display apparatus 100a according to an exemplary embodiment.

Referring to FIG. 1, the holographic display apparatus 100a according to an exemplary embodiment may include a light source 101 providing light, a spatial light modulator 104 forming a hologram pattern to modulate light incident thereon and to thereby reproduce a holographic image, a lens 102 through which the light incident from the light source 101 is collimated and the light modulated by the spatial light modulator 104 is focused onto a spatial filter 105, a retroreflective mirror 103 reflecting the parallel light transmitted from the lens 102 and changing a travel direction of the light by 180 degrees, and the spatial filter 105 configured to transmit only the holographic image focused by the lens 102. Also, the holographic display apparatus 100a may further include an eye tracker 111 tracking a pupil location of the observer, and a controller 110 adjusting locations of the light source 101 and the spatial filter 105 in response to a change in the pupil location of the observer received from the eye tracker 111.

The spatial light modulator 104 may form a hologram pattern for diffracting and modulating the incident light according to a hologram data signal provided by an image signal processor (not shown). The spatial light modulator 104 may utilize any one of a phase modulator for performing phase modulation, an amplitude modulator for performing amplitude modulation, and a complex modulator performing both phase modulation and amplitude modulation. Although the spatial light modulator 104 of FIG. 1 is a transmissive spatial light modulator, a reflective spatial light modulator may alternately be used. The transmissive spatial light modulator may utilize, for example, a semiconductor modulator based on a compound semiconductor such as GaAs, or a liquid crystal device (LCD). A reflective spatial light modulator may utilize, for example, a digital micromirror device (DMD), liquid crystal on silicon (LCoS) technology, or a semiconductor modulator.

The light source 101 may be a coherent light source that emits coherent light. For example, a laser diode (LD) may be used as the light source 101 in order to provide light having high coherence. However, if light has at least a certain level of spatial coherence, allowing the light to be sufficiently diffracted and modulated by the spatial light modulator 104, for example, a light-emitting diode (LED) may be used as the light source 101. In addition to an LED, any other light source may be used so long as light having spatial coherence is emitted therefrom. Although one light source 101 is illustrated in FIG. 1 for convenience of description, the light source 101 may include an array of a plurality of point light sources.

The light source 101 may be configured to provide light to only a semicircular region of the lens 102 with respect to an optical axis OX of the lens 102. For example, FIG. 1 illustrates that the light source 101 provides light toward an upper semicircular region of the lens 102 with respect to the optical axis OX. Light emitted from the light source 101 and diverged toward the lens 102 may be collimated by the lens 102 while passing through the upper semicircular region of the lens 102.

The retroreflective mirror 103 may have a symmetrically bent shape with respect to the optical axis OX. As shown in FIG. 1, the retroreflective mirror 103 may include a flat upper side mirror 103a and a flat lower side mirror 103b which are tilted so as to face each other. Edges of the upper side mirror 103a and the lower side mirror 103b are in contact with each other and may be located on the optical axis OX, and the upper side mirror 103a and the lower side mirror 103b may be symmetrically inclined with respect to the optical axis OX. Thus, the upper side mirror 103a may face the upper semicircular region of the lens 102 and the lower side mirror 103b may face a lower semicircular region of the lens 102. In this way, the light incident on the retroreflective mirror 103 may be re-directed in an opposite direction via two reflections. For example, the collimated light having passed through the upper semicircular region of the lens 102 may be reflected from the upper side mirror 103a of the retroreflective mirror 103 and then reflected again from the lower side mirror 103b, and may travel toward the lower semicircular region of the lens 102. Although the edges of the upper side mirror 103a and the lower side mirror 103b of the retroreflective mirror 103 are in contact with each other in FIG. 1, the upper side mirror 103a and the lower side mirror 103b may be separate.

In FIG. 1, the spatial light modulator 104 is disposed on an optical path between the lower side mirror 103b of the retroreflective mirror 103 and the lower semicircular region of the lens 102. However, the spatial light modulator 104 may be disposed anywhere along the optical path between the lens 102 and the retroreflective mirror 103. For example, the spatial light modulator 104 may be disposed on the optical path between the upper side mirror 103a of the retroreflective mirror 103 and the upper semicircular region of the lens 102. The parallel light may then be diffracted by the spatial light modulator 104 while the parallel light travels from the upper semicircular region of the lens 102 to the lower semicircular region. The light diffracted by the spatial light modulator 104 may then be focused onto a focal plane of the lens 102 while passing through the lower semicircular region of the lens 102. A holographic image may then be reproduced in the focal plane of the lens 102.

A typical spatial light modulator 104 is composed of an array of a plurality of pixels, and the array of the plurality of pixels may act as a pixel lattice. Therefore, the light incident on the spatial light modulator 104 may be diffracted and interfered with, by not only a hologram pattern formed on the spatial light modulator 104, but also by the pixel lattice consisting of the array of pixels of the spatial light modulator 104. Further, a portion of the incident light may not be diffracted by the hologram pattern but may pass through the spatial light modulator 104 without diffraction. As a result, in addition to the holographic image, a plurality of lattice spots may also be displayed on the focal plane of the lens 102. Such a plurality of lattice points may act as image noise which deteriorates the image quality of the holographic image and makes appreciation of the holographic image uncomfortable. Thus, the holographic image may be reproduced in an off-axis manner so that the holographic image is reproduced while avoiding a plurality of lattice points, in order to prevent the plurality of lattice points from being seen by an observer. In an off-axis reconstruction method, the spatial filter 105 may be arranged in the focal plane of the lens 102 to block the lattice points and only allow the holographic image to pass therethrough. Therefore, the observer may view only the holographic image.

Figure 4:
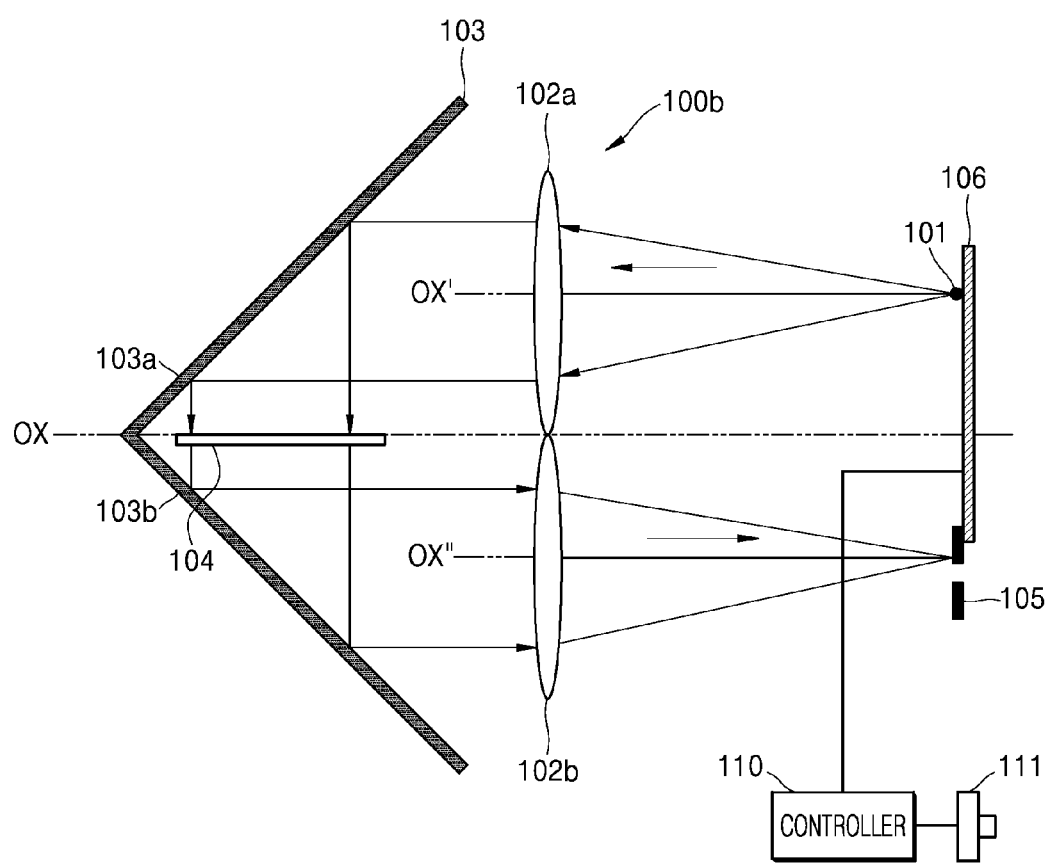
FIG. 4 schematically shows a configuration of a holographic display apparatus according to another exemplary embodiment.

In the above-described configuration of the holographic display apparatus 100a, both the light source 101 and the spatial filter 105 may be located in the focal plane of the lens 102. Therefore, the light source 101 and the spatial filter 105 may be bonded together or may be mounted together on a single stage, as shown in FIG. 4. In this case, it is possible to move the light source 101 and the spatial filter 105 simultaneously for purposes of eye tracking.

An eye tracking function is a function that adjusts a location of a viewing window in which a holographic image is reproduced as the observer moves, thereby enabling the observer to view the holographic image irrespective of the observer's location. To this end, the eye tracker 111 may obtain an image of an observer through a camera or the like, detect a pupil of the observer in the image, and analyze the location of the pupil. In addition, the eye tracker 111 may track a change in the pupil location of the observer in real time and provide the results to the controller 110. The controller 110 may then move the light source 101 and the spatial filter 105 in response to the change in the pupil location of the observer received from the eye tracker 111.

Figure 2:
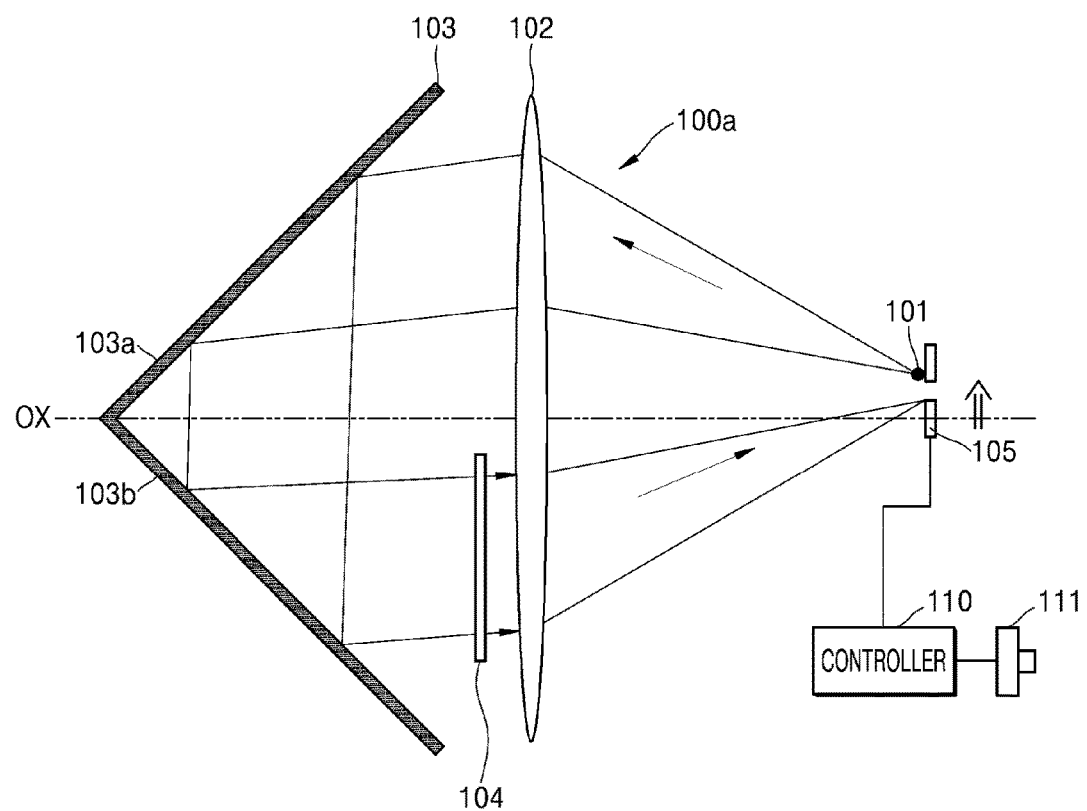
FIG. 2 illustrates an exemplary state in which a light source and a spatial filter are moved within the holographic display apparatus shown in FIG. 1.

For example, FIG. 2 illustrates an exemplary state in which the light source 101 and the spatial filter 105 are shifted within the holographic display apparatus 100a, as compared to FIG. 1. In response to a change in a location of an observer, the controller 110 may move the light source 101 and the spatial filter 105 together in a direction perpendicular to the optical axis OX. The location where a holographic image is focused is the same as a location of the shifted spatial filter 105, because the light source 101 and the spatial filter 105 move together in the focal plane. Therefore, since the light source 101 and the spatial filter 105 are moved together, the holographic image may always pass through the spatial filter 105, irrespective of the location change of the light source 101 for eye-tracking.

As described above, in the holographic display apparatus 100a according to the present exemplary embodiment, the light source 101 and the spatial filter 105 may move in synchrony with each other. For example, the spatial filter 105 may be moved by the same distance, in the same direction, and at the same time as the light source 101. A location of the holographic image focused by the lens 102 of the holographic display apparatus 100a (that is, a location of a viewing window) may change according to the movement of the light source 101. Movement of the viewing window may thus coincide with movement of the light source 101. Thus, since a location to which the holographic image is focused coincides with a location of the spatial filter 105, when moving the light source 101 to adjust the viewing window, the holographic image may pass through the spatial filter 105 and reach the observer while preventing the lattice points generated in the spatial light modulator 104 from being incident on the observer's eye.

Figure 3:
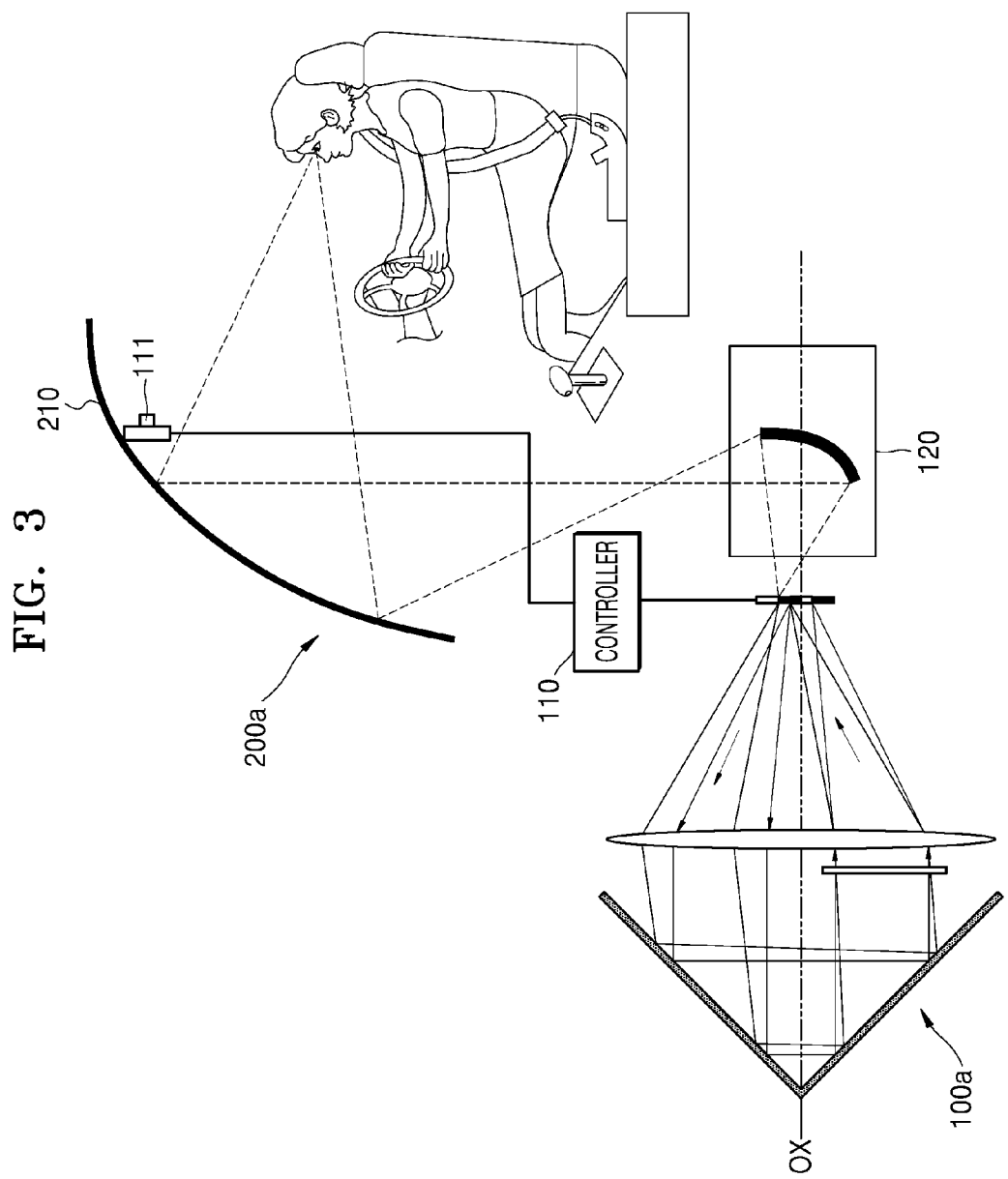
FIG. 3 schematically shows a configuration of a heads-up display apparatus including the holographic display apparatus shown in FIG. 1.

The holographic display apparatus 100a capable of adjusting the viewing window may be used, for example, as a heads-up display apparatus for a vehicle. For example, FIG. 3 schematically shows a configuration of a heads-up display apparatus 200a including the holographic display apparatus 100a shown in FIG. 1. Referring to FIG. 3, the heads-up display apparatus 200a may include the light source 101 for providing light, the spatial light modulator 104 for forming a hologram pattern for modulating incident light to reproduce a holographic image, the lens 102 that collimates incident light and focuses light incident from the spatial light modulator 104, the retroreflective mirror 103 that reflects the collimated light from the light source 101 through the lens 102 and changes a travel direction of the light by 180 degrees, the spatial filter 105 configured to transmit only the holographic image focused by the lens 102, the eye tracker 111 that tracks a pupil location of the observer, the controller 110 that adjusts locations of the light source 101 and the spatial filter 105 in response to a change in the pupil location of the observer received from the eye tracker 111, and an optical system 120 that reflects the holographic image toward a front mirror 210 of the vehicle. For example, a front windshield of the vehicle may serve as the front mirror 210. The configuration and function of the heads-up display apparatus 200a shown in FIG. 3 are the same as those of the holographic display apparatus 100a described with reference to FIG. 1 and FIG. 2, and thus detailed descriptions thereof will be omitted.

The heads-up display apparatus 200a may be installed in, for example, a dashboard of the vehicle and may provide a driver with an image that includes status information of the vehicle, driving information of the vehicle, navigation information, and the like. The holographic image reproduced by the spatial light modulator 104 may be viewed directly by the driver, or the holographic image may be reflected, for example, by the front mirror 210 of the vehicle and thereby viewed by the driver. The eye tracker 111 may be mounted on a ceiling portion of a vehicle interior from which the driver may be seen. The eye tracker 111 may continuously monitor a pupil location of the driver and may thereby provide the controller 110 with the pupil location. The controller 110 may then provide the holographic image to the pupil location of the driver in response to the pupil location of the driver received from the eye tracker 111. For example, the controller 110 may adjust locations of the light source 101 and the spatial filter 105 in response to the pupil location of the driver.

FIG. 4 schematically shows a configuration of a holographic display apparatus 100b according to another exemplary embodiment. Referring to FIG. 4, the holographic display apparatus 100b may include the light source 101 providing light, the spatial light modulator 104 forming a hologram pattern for modulating incident light to reproduce a holographic image, a first lens 102a collimating light incident from the light source 101, a second lens 102b focusing light incident from the spatial light modulator 104, the retroreflective mirror 103 reflecting the collimated light from the light source 101 through the first lens 102a and changing a travel direction of the light by 180 degrees, the spatial filter 105 configured allow only a holographic image focused by the second lens 102b to pass therethrough, the eye tracker 111 tracking a pupil location of an observer, and the controller 110 adjusting locations of the light source 101 and the spatial filter 105 in response to a change in the pupil location of the observer received from the eye tracker 111.

As compared with the holographic display apparatus 100a shown in FIG. 1, the holographic display apparatus 100b shown in FIG. 4 is different from the holographic display apparatus 100a shown in FIG. 1 in that the holographic display apparatus 100b includes two separate lenses, that is, the first lens 102a and the second lens 102b, instead of the single lens 102. The first lens 102a and the second lens 102b have the same refractive power. The first lens 102a and the second lens 102b may be disposed symmetrically with respect to the central optical axis OX of the entire optical system including the first lens 102a, the second lens 102b, and the retroreflective mirror 103. An optical axis OX' of the first lens 102a, an optical axis OX" of the second lens 102b, and the central optical axis OX of the entire optical system may be parallel to each other. The first lens 102a may be disposed facing the upper side mirror 103a of the retroreflective mirror 103. The second lens 102b may be disposed facing the lower side mirror 103b of the reflective mirror 103.

FIG. 4 shows that the spatial light modulator 104 is disposed between the upper side mirror 103a and the lower side mirror 103b of the retroreflective mirror 103, in parallel to the central optical axis OX of the entire optical system. However, as described above, the arrangement of the spatial light modulator 104 is not limited to the configuration of FIG. 4. For example, the spatial light modulator 104 may be disposed anywhere on an optical path from the first lens 102a to the second lens 102b via the retroreflective mirror 103.

The light source 101 may be disposed adjacent to the optical axis OX' of the first lens 102a. The spatial filter 105 may be disposed adjacent to the optical axis OX" of the second lens 102b. A distance between the light source 101 and the spatial filter 105 is increased in the exemplary embodiment shown in FIG. 4, as compared with that shown in the exemplary embodiment of FIG. 1. In this case, the light source 101 and the spatial filter 105 may be located in a focal plane of the second lens 102b. In order to move the light source 101 and the spatial filter 105 together, the holographic display apparatus 100b may further include a stage 106 on which the light source 101 and the spatial filter 105 are mounted together. In this way, the controller 110 may move the stage 106 in response to a change in a pupil location of an observer provided from the eye tracker 111, and thus the locations of the light source 101 and the spatial filter 105 may be adjusted together.

Figure 5:
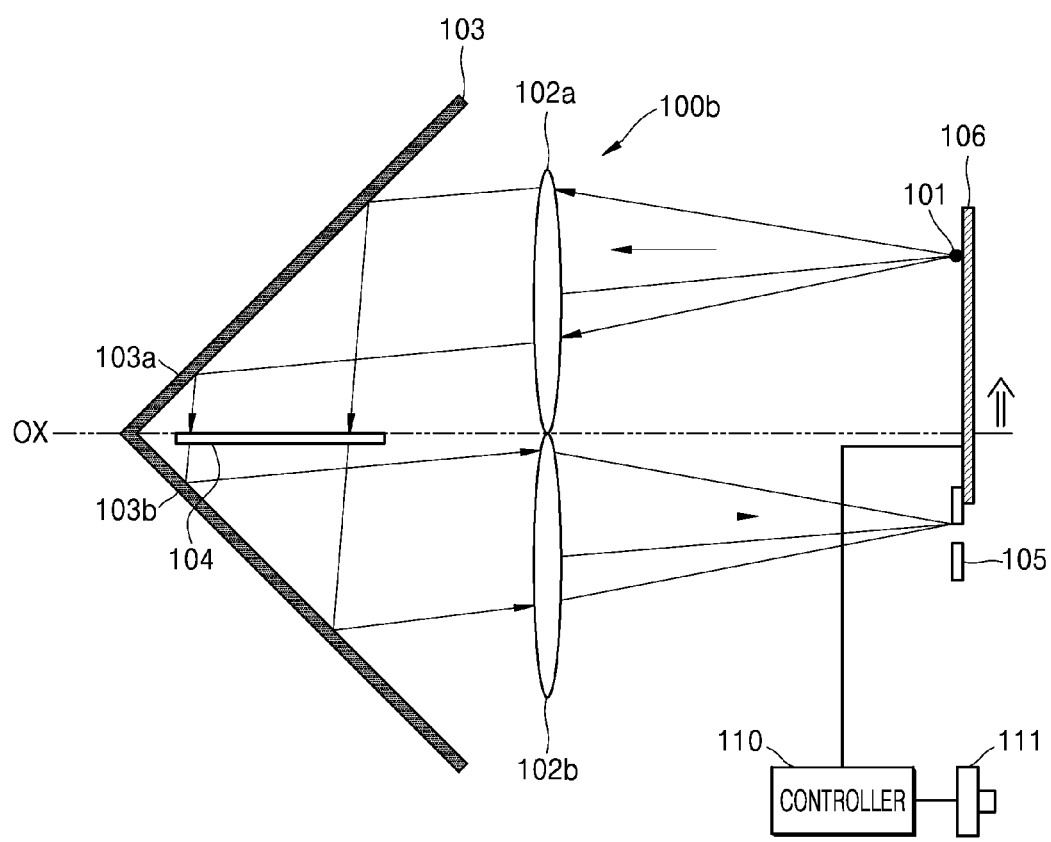
FIG. 5 illustrates an exemplary state in which a light source and a spatial filter are moved within the holographic display apparatus shown in FIG. 4.

For example, FIG. 5 illustrates an exemplary state in which the light source 101 and the spatial filter 105 are moved within the holographic display apparatus 100b shown in FIG. 4. The controller 110 may move the stage 106 in a direction perpendicular to the optical axis OX in response to a change in a location of an observer. Since the light source 101 and the spatial filter 105 are mounted on the stage 106 and move together in a focal plane, a location at which a holographic image is focused is the same as a location of the moved spatial filter 105. Therefore, since the light source 101 and the spatial filter 105 are always moved together, the holographic image may always pass through the spatial filter 105 irrespective of the location change of the light source 101 in response to eye-tracking.

FIGS. 4 and 5 illustrate that the light source 101 and the spatial filter 105 are mounted on the stage 106 and the controller 110 moves the stage 106. However, the present disclosure is not limited thereto. For example, a separate actuator may be provided for each of the light source 101 and the spatial filter 105, and the controller 110 may simultaneously control respective actuators at the same time so that the light source 101 and the spatial filter 105 are simultaneously moved within the same direction by the same distance.

Figure 6:
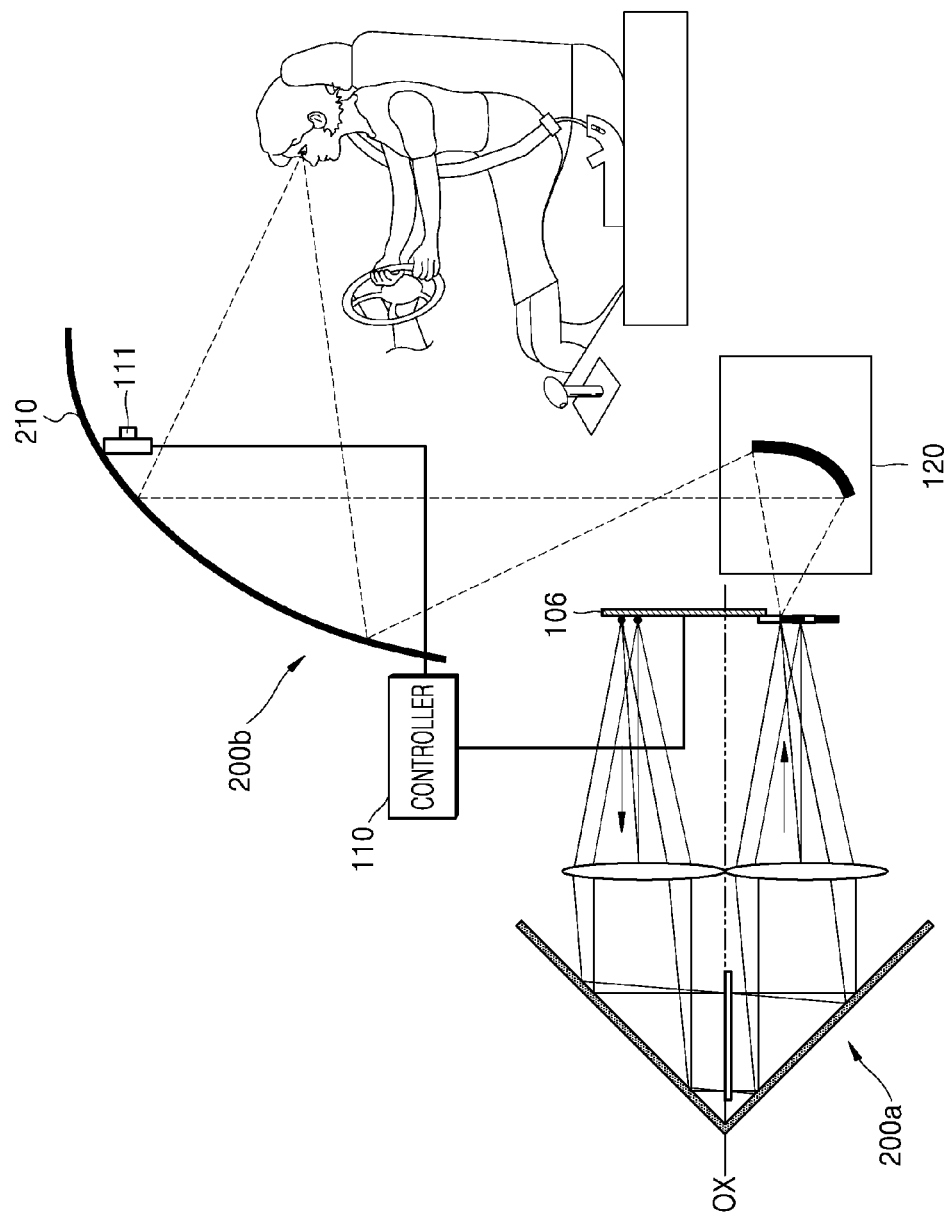
FIG. 6 schematically shows a configuration of a heads-up display apparatus including the holographic display apparatus shown in FIG. 4, according to an exemplary embodiment.

FIG. 6 schematically shows a configuration of a heads-up display apparatus 200b including the holographic display apparatus 100b shown in FIG. 4. Referring to FIG. 6, the heads-up display apparatus 200b may include the holographic display apparatus 100b and the optical system 120 that reflects a holographic image toward the front mirror 210 of a vehicle. The configuration and function of the heads-up display apparatus 200b shown in FIG. 6 are the same as those of the heads-up display apparatus 200a described in FIG. 3 except that the heads-up display apparatus 200b uses the holographic display apparatus 100b of FIG. 4, and thus detailed descriptions thereof will be omitted.

Figure 7:
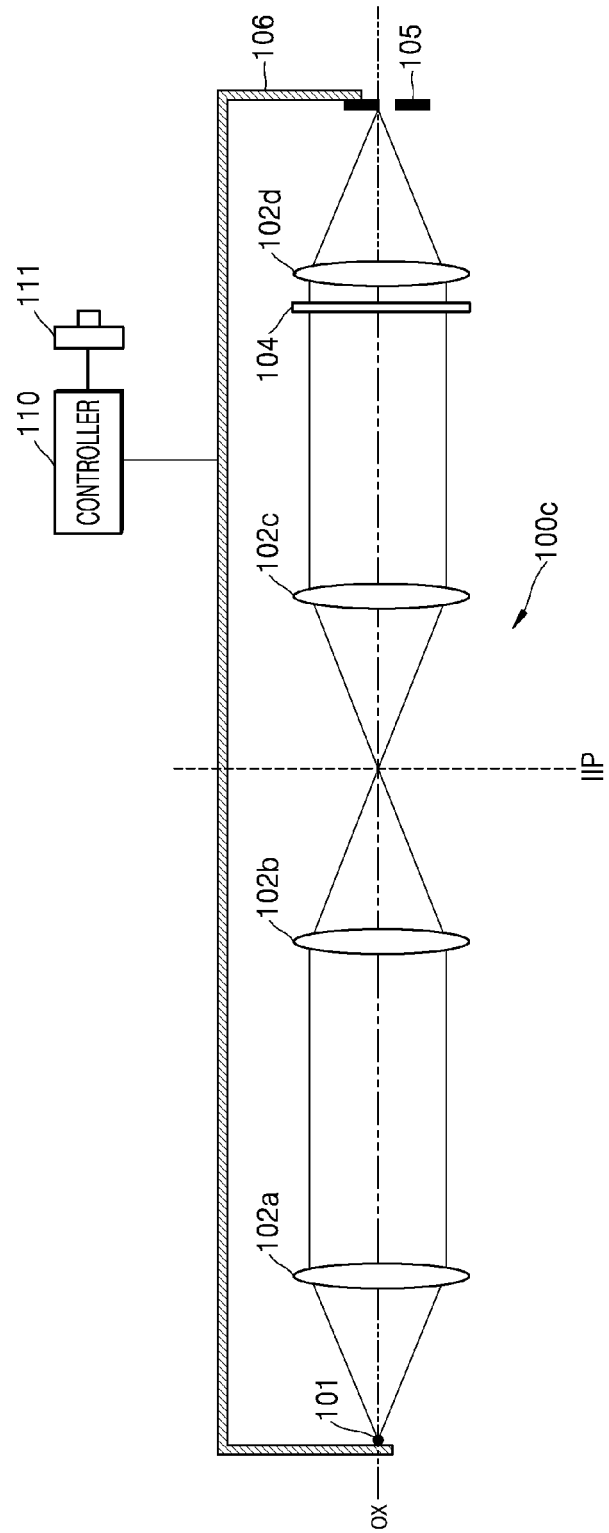
FIG. 7 schematically shows a configuration of a holographic display apparatus according to another exemplary embodiment.

In the holographic display apparatuses 100a and 100b shown in FIGS. 1 and 4, the optical path is bent 180 degrees via the retroreflective mirror 103, but holographic display apparatuses may be configured to have a linear optical path. For example, FIG. 7 schematically shows a configuration of a holographic display apparatus 100c according to another exemplary embodiment. Referring to FIG. 7, the holographic display apparatus 100c may include the light source 101 providing light, the first lens 102a collimating light incident from the light source 101, the second lens 102b focusing the collimated light to an intermediate image plane IIP, a third lens 102c collimating light coming from the intermediate image plane IIP, a fourth lens 102d focusing the collimated light onto a focal plane, the spatial light modulator 104 modulating the incident light to form a hologram pattern for reproducing a holographic image, the spatial filter 105 configured to allow only the holographic image focused by the fourth lens 102d to pass therethrough, the eye tracker 111 tracking a pupil location of an observer, and the controller 110 adjusting locations of the light source 101 and the spatial filter 105 in response to a change in the pupil location of the observer received from the eye tracker 111. The spatial light modulator 104 may be disposed on the optical path between the third lens 102c and the fourth lens 102d.

In the configuration of the holographic display apparatus 100c, a location change of the holographic image focused by the fourth lens 102d may coincide with a change in a location of the light source 101. For example, if the light source 101 moves in a direction perpendicular to the optical axis OX, the holographic image focused by the fourth lens 102d may move by the same distance, and in the same direction, as with respect to the optical axis OX. In the above-described configuration, the light source 101 may also move along the direction of the optical axis OX. For example, if the light source 101 moves along the direction of the optical axis OX, the holographic image focused by the fourth lens 102d also may move along the direction of the optical axis OX by the same distance that the light source 101 has moved.

Therefore, if the spatial filter 105 moves with the light source at the same time and in the same way, the holographic image may always pass through the spatial filter 105 irrespective of the location change of the light source 101. In order to move the light source 101 and the spatial filter 105 together, the holographic display apparatus 100c may further include the stage 106 on which the light source 101 and the spatial filter 105 are mounted together. The controller 110 may simultaneously adjust the locations of the light source 101 and the spatial filter 105 in the same manner by moving the stage 106 in response to the change in the pupil location of the observer provided by the eye tracker 111. However, the holographic display apparatus 100c does not necessarily include the stage 106. A separate actuator may be provided for each of the light source 101 and the spatial filter 105. The controller 110 may simultaneously move the light source 101 and the spatial filter 105 by the same distance in the same direction by simultaneously controlling each actuator.

Figure 8:
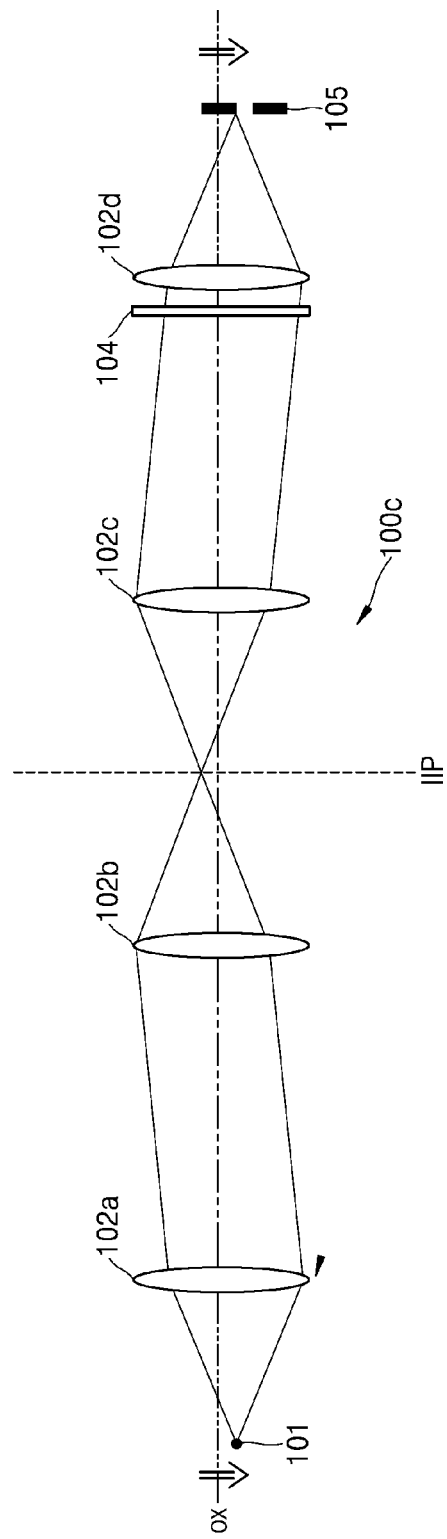
FIGS. 8 and 9 illustrate exemplary states in which a light source and a spatial filter are moved within the holographic display apparatus shown in FIG. 7.
Figure 9:
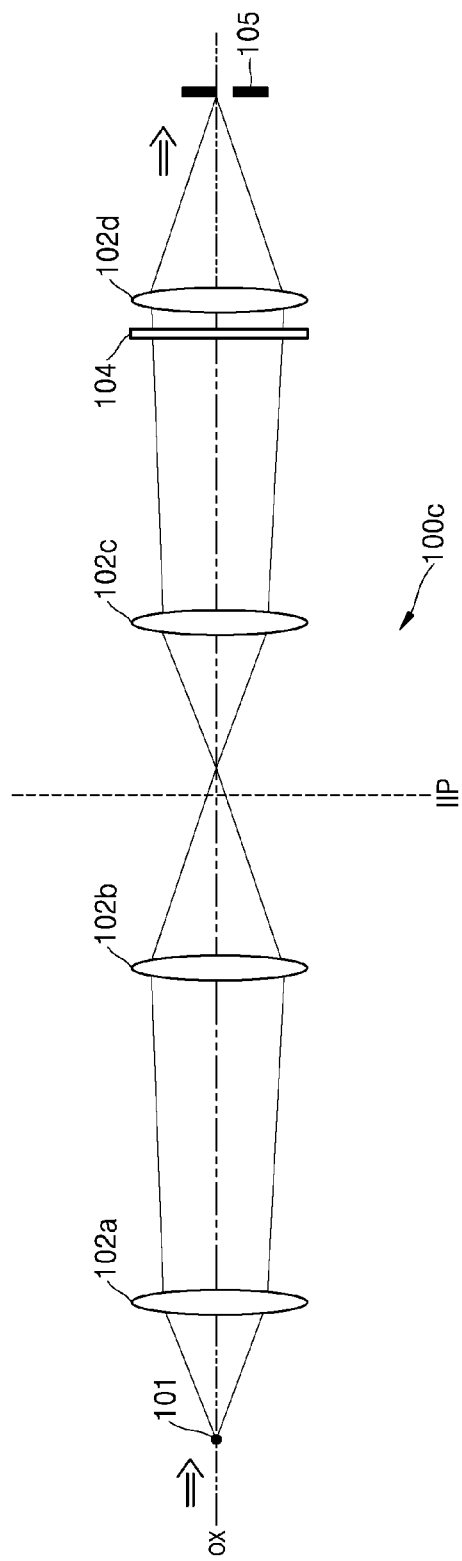

FIGS. 8 and 9 illustrate states in which the light source 101 and the spatial filter 105 are moved within the holographic display apparatus 100c shown in FIG. 7. Referring to FIG. 8, the light source 101 and the spatial filter 105 may move by the same distance, each in the same direction perpendicular to the optical axis OX. Thus, the location of a viewing window may be changed in the direction perpendicular to the optical axis OX. An observer may view a holographic image at the changed location. Referring to FIG. 9, the light source 101 and the spatial filter 105 may be moved by the same distance along the optical axis OX direction. For example, if the light source 101 moves toward the first lens 102a, the focal plane becomes farther away from the fourth lens 102d, and thus the spatial filter 105 may be also moved along the optical axis OX direction by the same distance that the light source 101 has moved.

Figure 10:
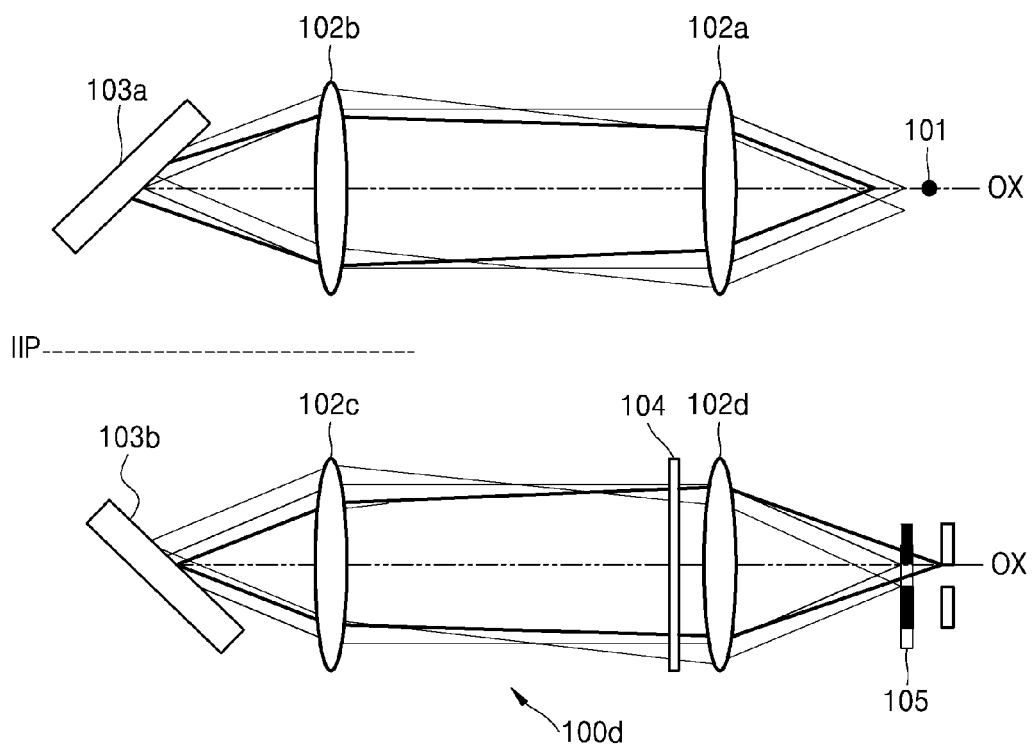
FIG. 10 shows a modified example in which an optical path is bent 180 degrees in the holographic display apparatus shown in FIG. 7.

The holographic display apparatus 100c shown in FIG. 7 may be modified such that an optical path may be bent via a retroreflective mirror 103 by 180 degrees. For example, FIG. 10 shows a modified example in which an optical path is bent 180 degrees within the holographic display apparatus 100c shown in FIG. 7. Referring to FIG. 10, the holographic display apparatus 100d may include a configuration of the holographic display apparatus 100c shown in FIG. 7 and may further include the retroreflective mirror 103 disposed in the optical path between the second lens 102b and the third lens 102c. The retroreflective mirror 103 may include the flat upper side mirror 103a and the flat lower side mirror 103b arranged such that they are inclined with respect to each other. Although edges of the upper side mirror 103a and the lower side mirror 103b of the retroreflective mirror 103 are in contact with each other in FIGS. 1 and 4, as shown in FIG. 10, the upper side mirror 103a and the lower side mirror 103b may be separate from each other. The upper side mirror 103a may be arranged to face the second lens 102b. The lower side mirror 103b may be arranged to face the third lens 102c. The intermediate image plane IIP may be positioned between the upper side mirror 103a and the lower side mirror 103b.

In the configuration shown in FIG. 10, the light source 101 and the spatial filter 105 may be disposed adjacent to the same side of the holographic display apparatus 100d as in the embodiment shown in FIGS. 1 and 4. However, when the light source 101 moves along the optical axis OX, the spatial filter 105 may move in a direction opposite to the light source 101, in contrast to the exemplary embodiment shown in FIG. 9.

Figure 11:
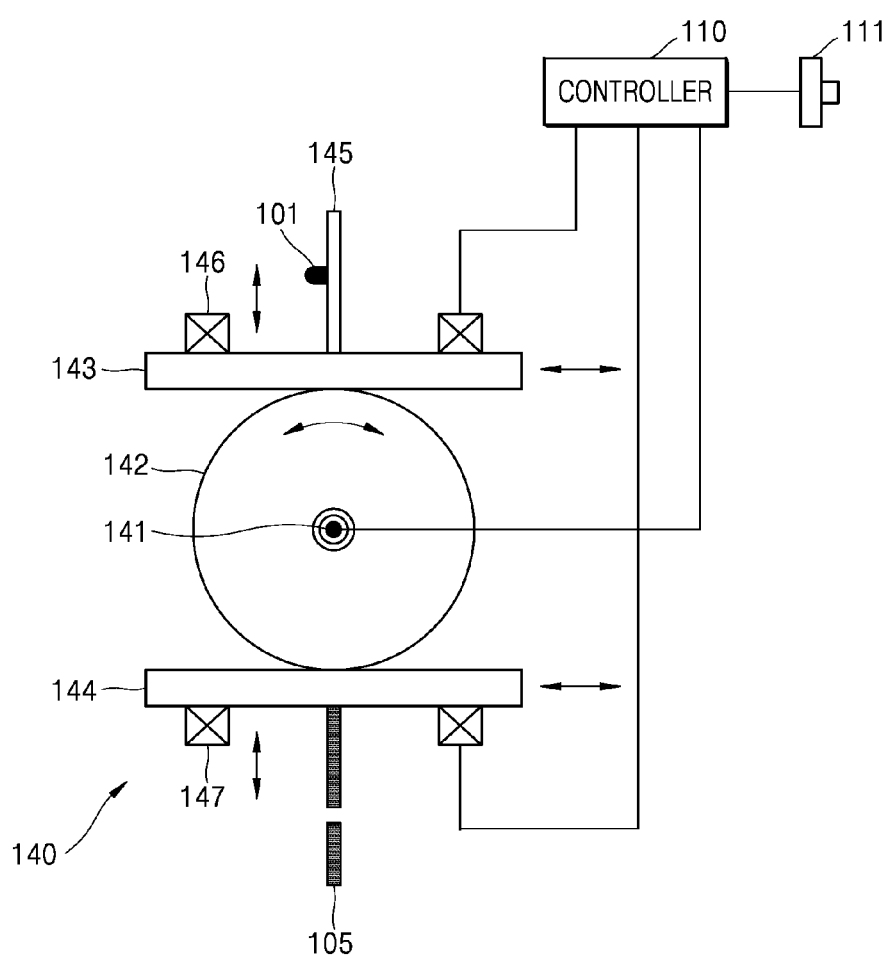
FIG. 11 shows an exemplary configuration of a driving apparatus for moving a light source and a spatial filter in the holographic display apparatus shown in FIG. 10.

FIG. 11 shows an exemplary configuration of a driving apparatus 140 for moving the light source 101 and the spatial filter 105 in the holographic display apparatus 100d shown in FIG. 10. Referring to FIG. 11, the driving apparatus 140 may include a rotatable circular wheel 142, a motor 141 for rotating the wheel 142, a flat plate-like first stage 143 disposed in contact with an upper outer circumferential surface of the wheel 142, a first actuator 146 for moving the first stage 143 up and down, a second stage 144 in the form of a flat plate disposed to be in contact with a lower outer circumferential surface of the wheel 142, and a second actuator 147 for moving the second stage 144 up and down 142. The light source 101 may be disposed on the first stage 143. The spatial filter 105 may be disposed on the second stage 144. The driving apparatus 140 may further include a support plate 145 for fixing the light source 101 on the first stage 143, as required.

The controller 110 may control the driving apparatus 140 shown in FIG. 11 in response to a change in a pupil location of an observer received from the eye tracker 111. For example, when changing a viewing window in a direction perpendicular to the optical axis OX, the controller 110 may control the first and second actuators 146 and 147 to move the first and second stages 143 and 144 in the direction perpendicular to the optical axis OX. Then, the light source 101 and the spatial filter 105 may move by the same distance along the direction perpendicular to the optical axis OX.

Further, when changing the viewing window in the direction parallel to the optical axis OX, the controller 110 may control the motor 141 to rotate the wheel 142. The first stage 143 and the second stage 144, which are in contact with an outer circumferential surface of the wheel 142, may move in opposite directions along the direction parallel to the optical axis OX, in response to the movement of the wheel 142. For example, if the wheel 142 rotates clockwise, the first stage 143 may move to the right and the second stage 144 may move to the left in FIG. 11. Therefore, the light source 101 and the spatial filter 105 may move by the same distance in opposite directions.

Figure 12:
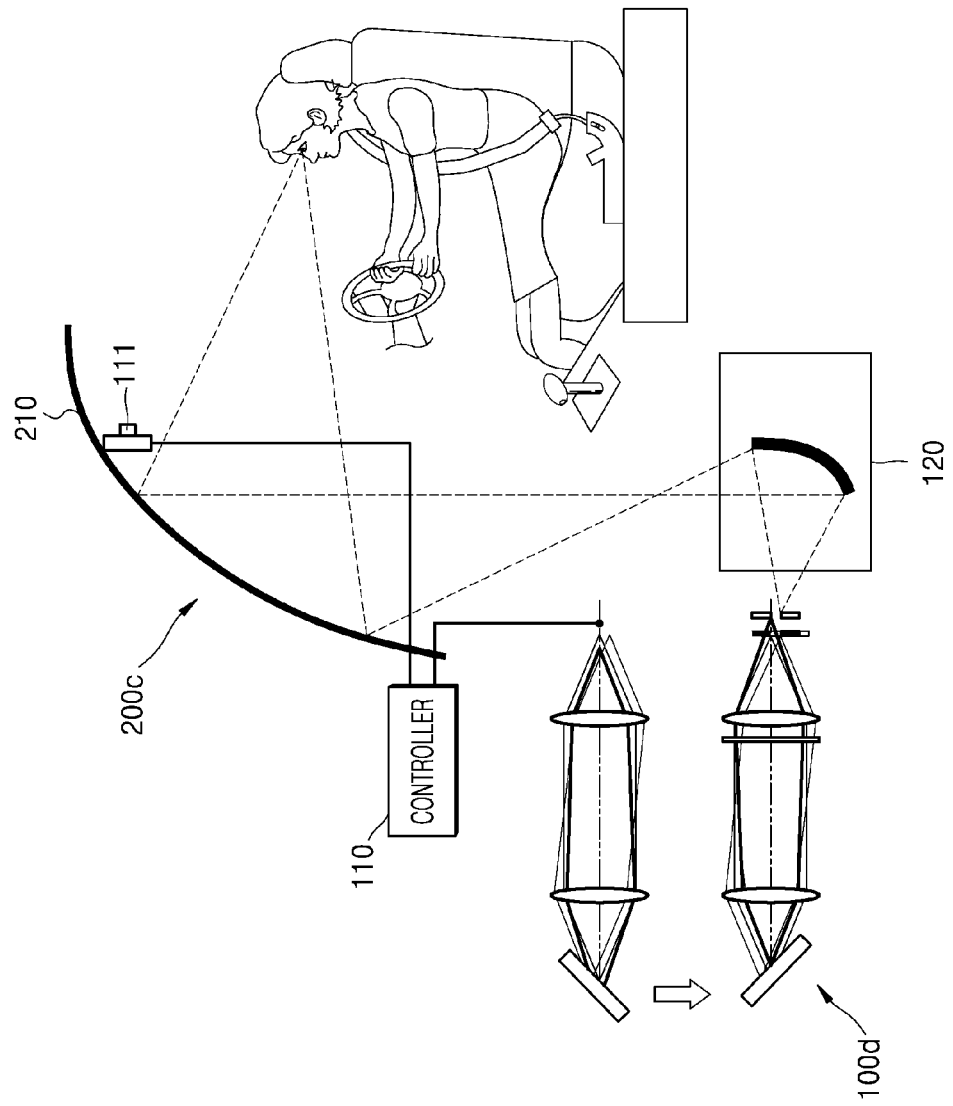
FIG. 12 schematically shows a configuration of a heads-up display apparatus 200c including the holographic display apparatus shown in FIG. 10, according to an exemplary embodiment.

FIG. 12 schematically shows a configuration of a heads-up display apparatus 200c including the holographic display apparatus 100d shown in FIG. 10. Referring to 12, the heads-up display apparatus 200c may include the holographic display apparatus 100d and the optical system 120 that reflects a holographic image toward the front mirror 210 of a vehicle. In addition, the heads-up display apparatus 200c may include the holographic display apparatus 100c shown in FIG. 7 instead of the holographic display apparatus 100d shown in FIG. 10. The configuration and the function of the heads-up display apparatus 200c shown in FIG. 12 are the same as those of the heads-up display apparatuses 200a and 200b described in FIGS. 3 and 6, except that the heads-up display apparatus 200c uses the holographic display apparatus 100d shown in FIG. 10, and thus detailed descriptions thereof will be omitted.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope defined by the following claims.

What is claimed is:

1. A holographic display apparatus comprising:
a light source configured to output light;
a spatial light modulator configured to modulate incident light and thereby reproduce a holographic image;
a lens configured to collimate light incident thereon from the light source and to focus light incident thereon from the spatial light modulator;
a retroreflective mirror configured to reflect collimated light incident thereon from the lens and thereby change a travel direction of the light incident thereon by 180 degrees;
a spatial filter configured to transmit only the holographic image;
an eye tracker configured to track a pupil location of an observer; and
a controller configured to adjust locations of the light source and the spatial filter in response to information identifying a change in the pupil location of the observer received from the eye tracker.

2. The holographic display apparatus of claim 1, wherein the light source and the spatial filter are adjacent to each other in a focal plane of the lens.

3. The holographic display apparatus of claim 1, further comprising a stage, wherein the light source and the spatial filter are mounted on the stage.

4. The holographic display apparatus of claim 1,
wherein the light source and the spatial filter are movable in a direction perpendicular to an optical axis of the lens, and
wherein the controller is configured to move the light source and the spatial filter simultaneously in a same direction by a same distance.

5. The holographic display apparatus of claim 1,
wherein the lens comprises a first semicircular region and a second semicircular region, and
the light source is configured to provide light to the first semicircular region of the lens.

6. The holographic display apparatus of claim 5, wherein the retroreflective mirror comprises a first mirror and a second mirror, wherein the first mirror is tilted to face the second mirror and the second mirror is tilted to face the first mirror,
wherein the first mirror and the second mirror are symmetrically tilted with respect to an optical axis of the lens,
wherein the first mirror is positioned to reflect light incident thereon from the first semicircular region of the lens toward the second mirror; and
wherein the second mirror is positioned to reflect light incident thereon from the first mirror toward the second semicircular region of the lens.

7. The holographic display apparatus of claim 1, wherein the spatial light modulator is disposed on an optical path between the lens and the retroreflective mirror.

8. A heads-up display apparatus comprising:
a holographic display apparatus; and
an optical system configured to reflect a holographic image reproduced by the holographic display apparatus toward a front mirror of a vehicle,
wherein the holographic display apparatus comprises:
 a light source configured to output light;
 a spatial light modulator configured to modulate incident light and thereby reproduce the holographic image;
 a lens configured to collimate light incident thereon from the light source and to focus light incident thereon from the spatial light modulator;
 a retroreflective mirror configured to reflect collimated light incident thereon from the lens and thereby change a travel direction of the light incident thereon by 180 degrees;
 a spatial filter configured to transmit only the holographic image;
 an eye tracker configured to track a pupil location of an observer; and
 a controller configured to adjust locations of the light source and the spatial filter in response to information identifying a change in the pupil location of the observer received from the eye tracker.

* * * * *